United States Patent [19]

Hayano et al.

[11] Patent Number: 5,132,966
[45] Date of Patent: Jul. 21, 1992

[54] CALL CONTROL WITH TRANSMISSION PRIORITY IN A PACKET COMMUNICATION NETWORK OF AN ATM TYPE

[75] Inventors: Shin-ichiro Hayano; Hiroshi Suzuki, both of Tokyo, Japan

[73] Assignee: NEC Corporation, Tokyo, Japan

[21] Appl. No.: 496,973

[22] Filed: Mar. 23, 1990

[30] Foreign Application Priority Data

Mar. 23, 1989 [JP] Japan .................................. 1-72117
Jul. 27, 1989 [JP] Japan .................................. 1-195473

[51] Int. Cl.$^5$ .............................................. H04J 3/26
[52] U.S. Cl. .................................. 370/79; 370/85.6; 370/94.1
[58] Field of Search ................. 370/79, 84, 85.6, 94.1, 370/60

[56] References Cited

U.S. PATENT DOCUMENTS 4,823,342  4/1989  Morita et al. .................... 370/79

OTHER PUBLICATIONS

Thomas et al., "Asynchronous Time-Division Techniques: An Experimental Packet Network Integrating Videocommunication," ISS (International Switching Symposium) '84 Florence, May 7-11, 1984.
Woodruff et al., "A Congestion Control Framework for High-Speed Integrated Packetized Transport", pp. 7.1.1-7.1.5. CH2535-3/88/000-0203. IEEE 1989.
Schaffer, "Synchronous and Asynchronous Transfer Modes in the Future Broadband ISDN", pp. 476..1-47.6.7. CH2538-7/88/0000-1552, IEEE 1988.

Primary Examiner—Douglas W. Olms
Assistant Examiner—Melvin Marcelo
Attorney, Agent, or Firm—Foley & Lardner

[57] ABSTRACT

In a high-speed packet multiplex communication network including a transmission line with a predetermined bandwidth and accommodating a plurality of information sources, the sources having various packet delivery rates over a range of between a peak rate and a lower rate than an average rate and demanding various transport performances, the sources are preliminarily classified into a plurality of types according to transport performances required and different transmission priorities are assigned to the different types, respectively. Bandwidths of sources of first priority and second priority are determined ones corresponding to the peak rate and the average rate, respectively. A virtual bandwidth may be calculated for the second priority source as a value between the peak and average rates. In response to connection requests from the sources, each of the connection requests is admitted when a bandwidth defined by the priority of each source is accepted in a residual bandwidth of the predetermined bandwidth, and the packets from the source of the first priority are preferentially transmitted to the transmission line, packets of the second priority source are transmitted when packets of the first priority source are absent. Thus, high bandwidth efficiency is insured while the high transport performance of the first priority source is maintained.

15 Claims, 9 Drawing Sheets

CALL CONTROL WITH TRANSMISSION PRIORITY IN A PACKET COMMUNICATION NETWORK OF AN ATM TYPE

BACKGROUND OF THE INVENTION

1. Field of the Invention

The present invention relates to high-speed integrated communication network of an asynchronous transfer mode (ATM) of packetized cells, and in particular, to call control comprising admission control for connection requests from information sources and transmission control of the packetized cells from the information sources of admitted or accepted connection requests to a transmission line required by the admitted connection requests.

2. Description of the Prior Art

In a known digital communication network, a packet multiplex technique is used where digital information is packetized into a plurality of packets or cells each comprising a section of the digital information of a fixed bit length with a header or a label for ensuring discrimination of the information source and destination. The packets are transmitted on the required transmission line by the time-division multiplex technique.

In an integrated communication network for various services such as telephone, data, and videocommunication services, the ATM technique is used for time-division multiplexing packets from different sources such as a telephone set, a personal computer and a video camera device on the required transmission line. There is difference in bit rates between information signals from those sources and therefore, packet delivery rates are different between those sources. Accordingly, packets of information of a high-bit rate signal are more frequently inserted into time slots in comparison with packets of information of a slow-bit rate signal by the ATM technique.

A packet network using the ATM technique is disclosed in a paper by A. Thomas et al entitled "ASYNCHRONOUS TIME-DIVISION TECHNIQUES: AN EXPERIMENTAL PACKET NETWORK INTEGRATING VIDEOCOMMUNICATION" published at ISS (International Switching Symposium) '84 florence, 7-11 May 1984 (Reference I), another paper by Woodruff et al entitled "A CONGESTION CONTROL FRAMEWORK FOR HIGH-SPEED INTEGRATED PACKETIZED TRANSPORT", P.P. 7.1.1.–7.1.5. CH2535-3/88/0000–0203,IEEE 1989 (Reference II), another paper by Schaffer entitled "SYNCHRONOUS AND ASYNCHRONOUS TRANSFER MODES IN THE FUTURE BROADBAND ISDN", P.P. 47.6.1–47.7.6.7. CH2538-7/88/0000-1552, IEEE 1988 (Reference III), and others.

It is needless to say that a transmission line has a transmission capacity or a predetermined bandwidth. While, a part of the transmission capacity is used for transferring information from a source. Accordingly, the number of source simultaneously using a single transmission line is restricted by the capacity of the transmission line and a bandwidth demanded for transferring information of respective sources. Therefore, when a new connection request is originated from a source for using a transmission line, admission control is performed in order to decide whether the new connection request is accepted or rejected.

The decision to admit the new connection is based on whether a required transport performance can be maintained or not. The required transport performance is dependent on traffic descriptors for the requested connection's traffic flow characteristics, such as average bandwidth, peak bandwidth, burstiness, etc.

In a conventional method, a virtual bandwidth is used as a parameter of the required transport perfomance and is defined for the requested connection as a value between the connection's average and peak rate.

When a new connection request is originated from an information source, a virtual bandwidth of the new connection is determined from the connection's descriptors and is compared with a residual bandwidth which is difference between the predetermined bandwidth of the transmission line and a sum of virtual bandwidths of connections already using the transmission line. When the virtual bandwidth of the new cohnection is smaller than the residual virtual bandwidth, the new connection request is accepted and a virtual circuit is set up over the network including the transmission line. Then, the packets from the information source are transferred through the virtual circuit.

On the other hand, when the virtual bandwidth of the new connection is larger than the residual bandwidth, the new connection request is rejected.

It is usual that a packet delivery rate in each connection varies. Therefore, the required transport performances of the accepted connections are badly effected from each other.

A bandwidth for each connection can be decided based on the peak rate or the maximum rate of the connection. Although the transport performance is maintained, a bandwidth efficiency is degraded because the packet rate is usually lower than the peak rate.

SUMMARY OF THE INVENTION

It is an object of the present invention to provide a call control for connection requests in the high-speed communication network of a type for asynchronous time-division multiplexing of packetized digital information cells, which enables to insure the required transport performance for each connection while maintaining the bandwidth efficiency.

The present invention is applicable to a call control method in a high-speed packet multiplex communication network including a transmission line with a predetermined bandwidth and accommodating a plurality of information sources, the information sources having various packet delivery rates over a range of between a peak rate and a lower rate than an average rate and demanding various transport performances, each of the packets comprising a header and a fixed bit length of digital information section. The call control method including steps of: deciding whether a connection request from a specific one of the plurality of information sources in admitted or rejected to accept the specific information source when the connection request is admitted, the connection request requiring to transport specific packets from the specific information source through the transmission line; and transmitting, upon acceptance of the specific information source, specific packets from the specific information source onto the transmission line by a time-division multiplex fashion in an asynchronous transfer mode. According to the present invention, the method comprises; the information sources being preliminarily classified into a plurality of types, a first one of which demands a very high transport performance with another second type demanding a comparatively high transport performance, the first type being assigned with a first priority and the second type being assigned with a second priority, the connection request containing a code indicating a specific priority defined by the type of the specific information source. The deciding step comprising steps of: detecting the specific priority in the connection request; assigning a specific bandwidth to the specific information source so that the specific bandwidth is a maximum bandwidth corresponding to the peak rate when the specific priority is the first priority while the specific bandwidth is an average bandwidth corresponding to the average rate when the specific priority is the second priority; determining whether or not the predetermined bandwidth of the transmission line is larger than a sum of the specific bandwidth and a bandwidth assigned to all ones of the information sources currently accepted; and admitting the connection request to accept the specific information source when the predetermined bandwidth is determined larger than the sum. The transmitting step comprising steps of; detecting the specific priority of the specific packets from the specific information source so that the specific packets are determined as first priority packets when the specific priority is the first priority while the specific packets are determined as second priority packets when the specific priority is the second priority; and transmitting the specific packets onto the transmission line so that the first priority packets are preferentially transmitted while the second priority packets are transmitted during a time duration when there are not first priority packets to be transmitted.

The control method further comprises steps of: monitoring a traffic flow of the specific packets from the specific information source after the specific information source is accepted, and throwing away excessive packets of the specific packets when the packet delivery rate from the specific information source exceeds the peak rate.

DESCRIPTION OF PREFERRED EMBODIMENTS

Prior to description of preferred embodiments of the present inevntion, the prior art will be described for assistance of better understanding of the present invention.

Figure 1:
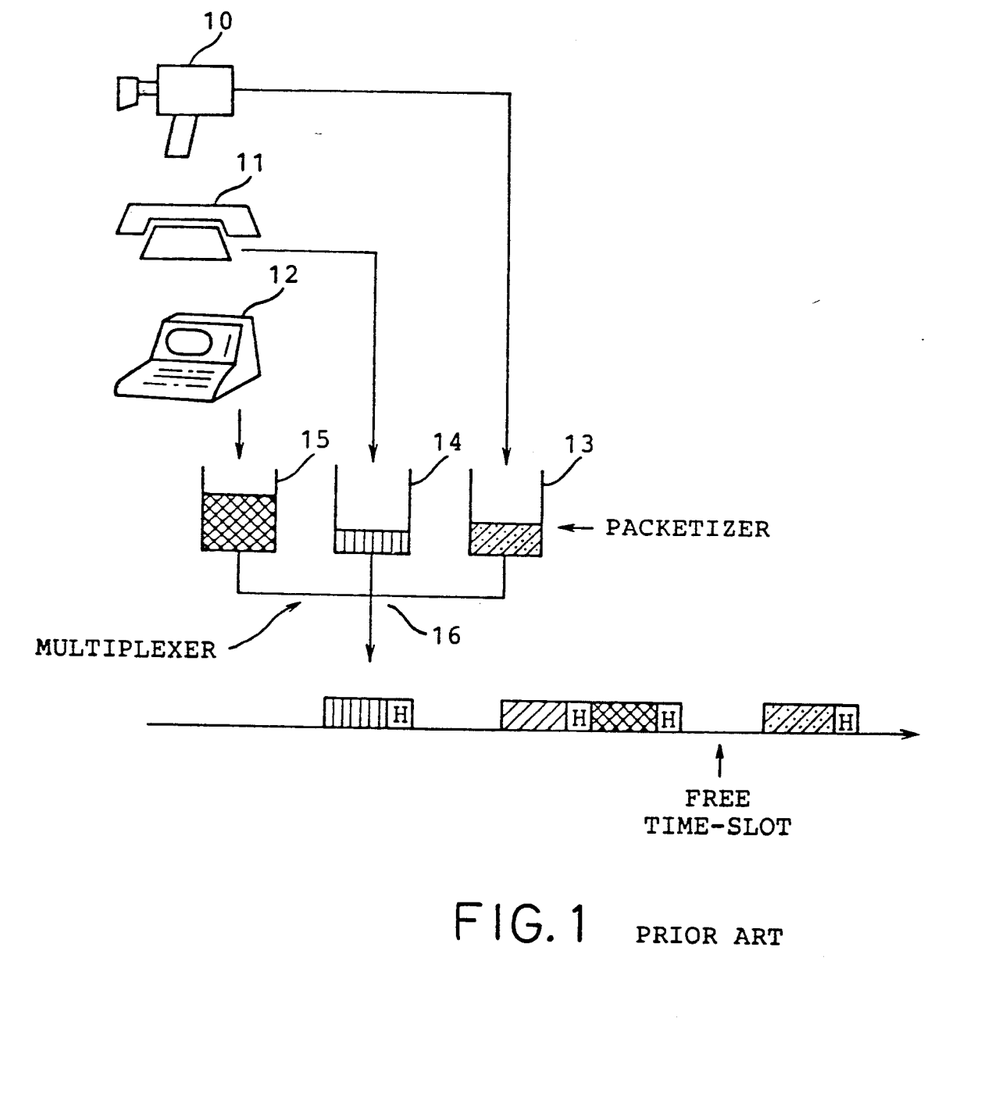
FIG. 1 is a schematic view for illustrating the ATM multi-bit rate multiplexing.

Referring to FIG. 1, the ATM technique will be described for time-division multiplexing packets from different sources 10-12 such as a video set, a telephone set, and a personal computer onto a transmission line. Digital information signals of different bit rates from sources 10-12 are gathered at respective packetizers 13-15 and individually are formed into packetized cells or packets each having a fixed bit length and a header H. The packets from packetizers 13-15 are multiplexed at a multiplexer 16 and transmitted to the transmission line. That is, those packet signals are inserted into different time slots on the transmission line so that packets of the high bit-rate signals, for example, video camera signal, are more frequently inserted into the time slots, as shown in the figure. Therefore, the packet signal of the video camera signal has a high packet rate or a wide bandwidth and the other packet signals of the telephone signal and the data signal the relatively narrow bandwidths.

Since the transmission line has a predetermined transmission capacity or a predetermined acceptable bandwidth, the number of sources simultaneously accessible to the transmission line is limited. Accordingly, upon connection requests, admission control is effected with use of the virtual bandwidth in order to decide whether the connection requests are acceptable or rejected, as descirbed in the preamble of the description.

Figure 2:
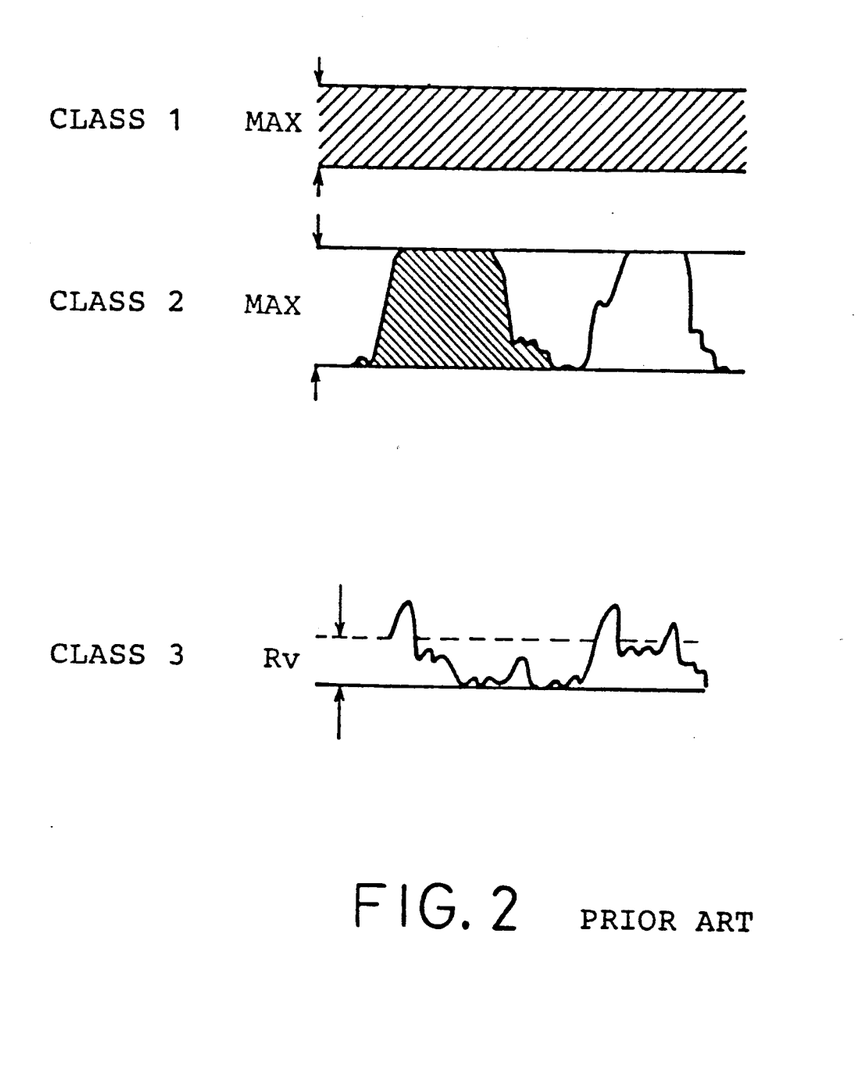
FIG. 2 is a schematic view for illustrating classes of different packet delivery rates from different information sources.

Actual connections will be classified into the following three classes as shown in FIG. 2:

Class 1: connection, for example, a video information signal of moving picture, having a fixed bandwidth, that is, the peak packet rate is equal to the average packet rate;

Class 2: connection, for example, a video information signal of a stationary picture having a high peak packet rate so that wide and fixed bandwidth must be decided based on the peak rate for insuring the required transport performance; and Class 3: connection for which a virtual bandwidth lower than its peak packet rate can be decided for insuring the required transport performance.

When classes 1 and 2 have a priority and are assigned with wide or maximum bandwidths corresponding to the individual peak packet rates and when Class 3 is assigned with a virtual bandwidth narrower than its peak packet bandwidth, the required transport performances of Classes 1 and 2 are supposedly guaranteed. However, they are badly effected by Class 3 because the packet rate of Class 3 varies from time to time.

Figure 3:
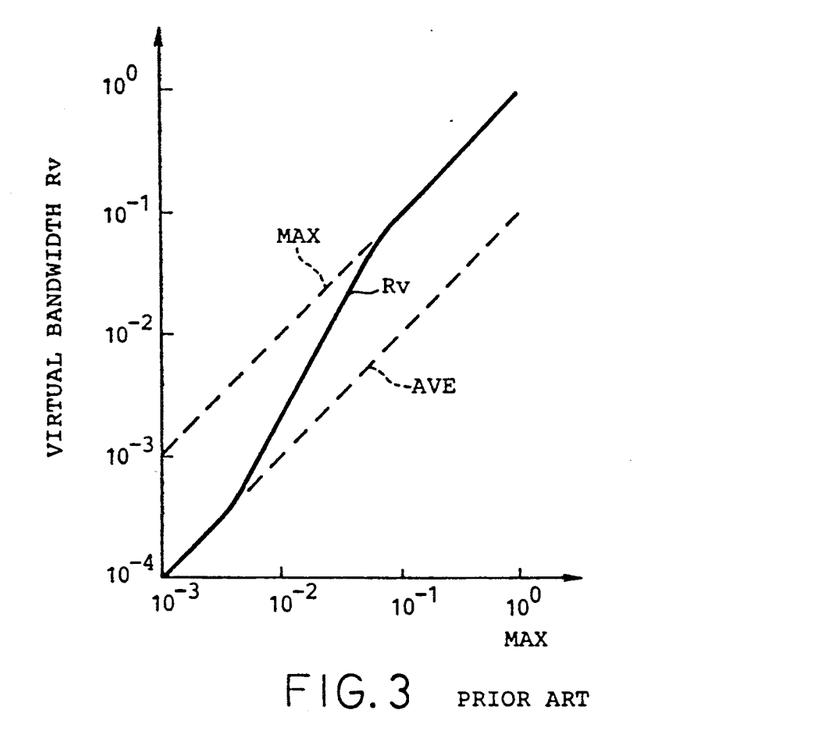
FIG. 3 is a graphic view for explaining assignment of a virtual bandwidth of information for a connection request admitted.

Referring to FIG. 3, the virtual bandwidth Rv is generally decided to be a value between the maximum bandwidth MAX and the average bandwidth AVE as shown in the figure. In FIG. 3, those bandwidth is normalized by the link capacity (=1). The virtual bandwidth Rv is dependent on the maximum bandwidth.

Figure 4:
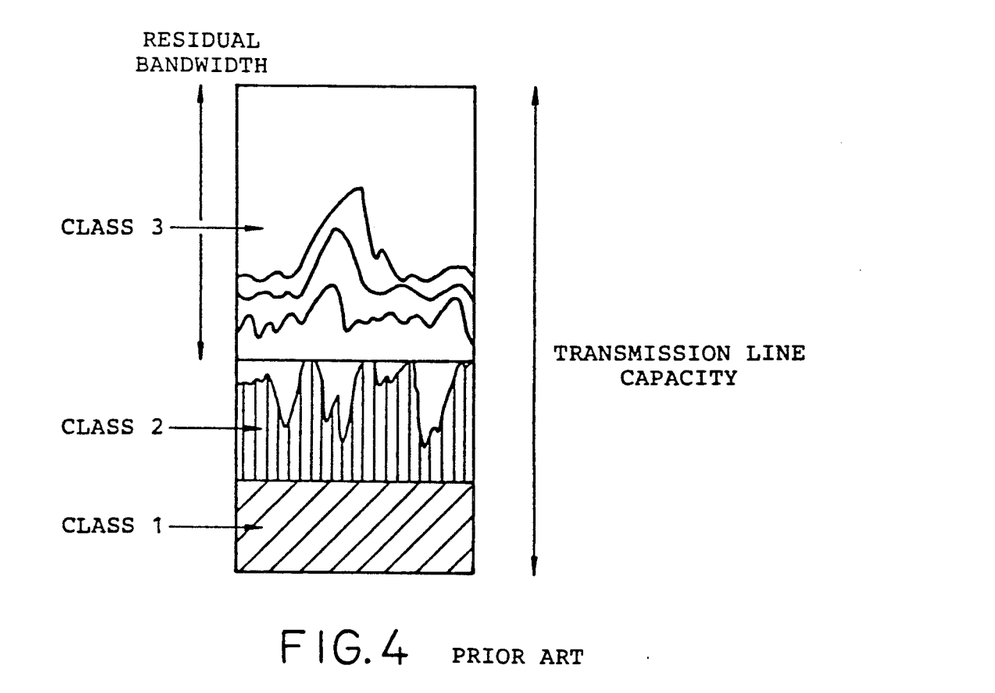
FIG. 4 is a schematic view illustrating bandwidth assigned to three different information.

When Classes 1, 2 and 3 are multiplexed on the same transmission line, Class 3 is assigned with a residual bandwidth as the virtual bandwidth. The residual bandwidth is a difference between the transmission capacity and the sum of maximum bandwidths of Classes 1 and 2, as shown in FIG. 4. However, the bandwidth actually used by Classes 1 and 2 varies so that the residual bandwidth also varies. Accordingly, the virtual bandwidth for Class 3 must be renewed by calculation which is very complex.

Figure 5:
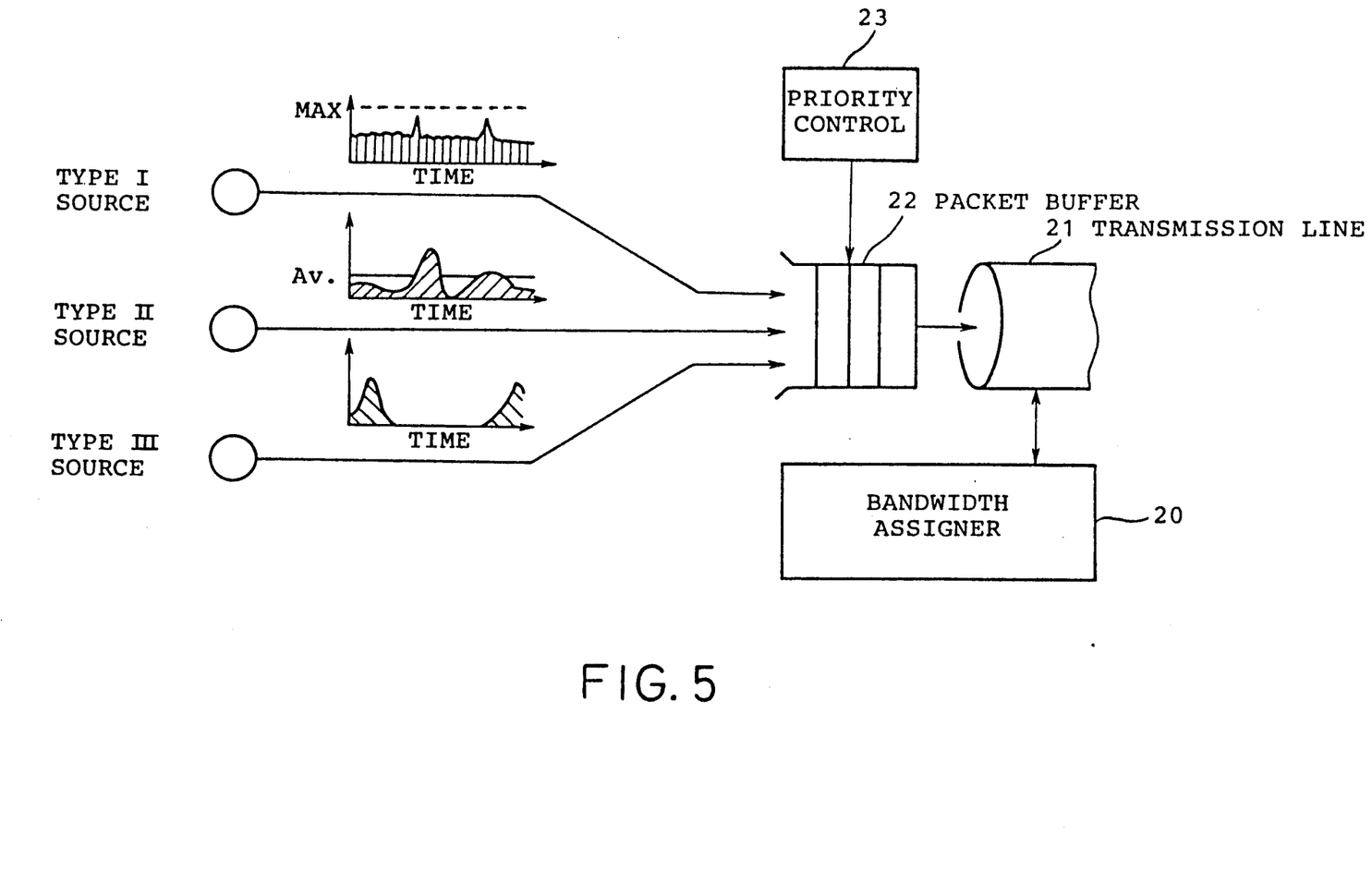
FIG. 5 is a schematic diagram view illustrating a brief concept of the present invention.

Referring to FIG. 5, description will be made as regards a general concept of the present invention.

The network provides three priority classes for transmitting various kinds of information effectively, and actual sources or connections are therefore classified into three, that is, Type I requires a high transport performance and continuously delivers packets at a rate nearly equal to the maximum packet rate, Type II requiring a relatively high transport performance and continuously delivering packets at a variable packet rate, and Type III does not require a high transport performance. Types I, II and III are assigned with priorities of I, II and III, respectively.

Upon connection requests from the soruces of Types I, II and III, a bandwidth assigner 20 assigns bandwidths for Types I, II and III sources according to the priorities contained in the connection request applied thereto.

In response to a connection request from Type I source, the bandwidth assigner 20 compares a residual or non-used bandwidth of a transmission line 21 with the maximum bandwidth of the source of Type I according to Priority I and accepts the connection request when the former is larger than the latter. Then, a virtual circuit is set up. When a connection request is originated from the source of Type II, the bandwidth assigner 20 accepts the connection request and assigns the average bandwidth according to Priority II to the source of Type II, when the average bandwidth is smaller than the residual bandwidth. Then, a virtual circuit is set up for Type II source. When the source of Type III originates a connection request, the bandwidth assigner 20 does not assign any bandwidth but sets up a virtual circuit for the source of Type III.

Figure 7:
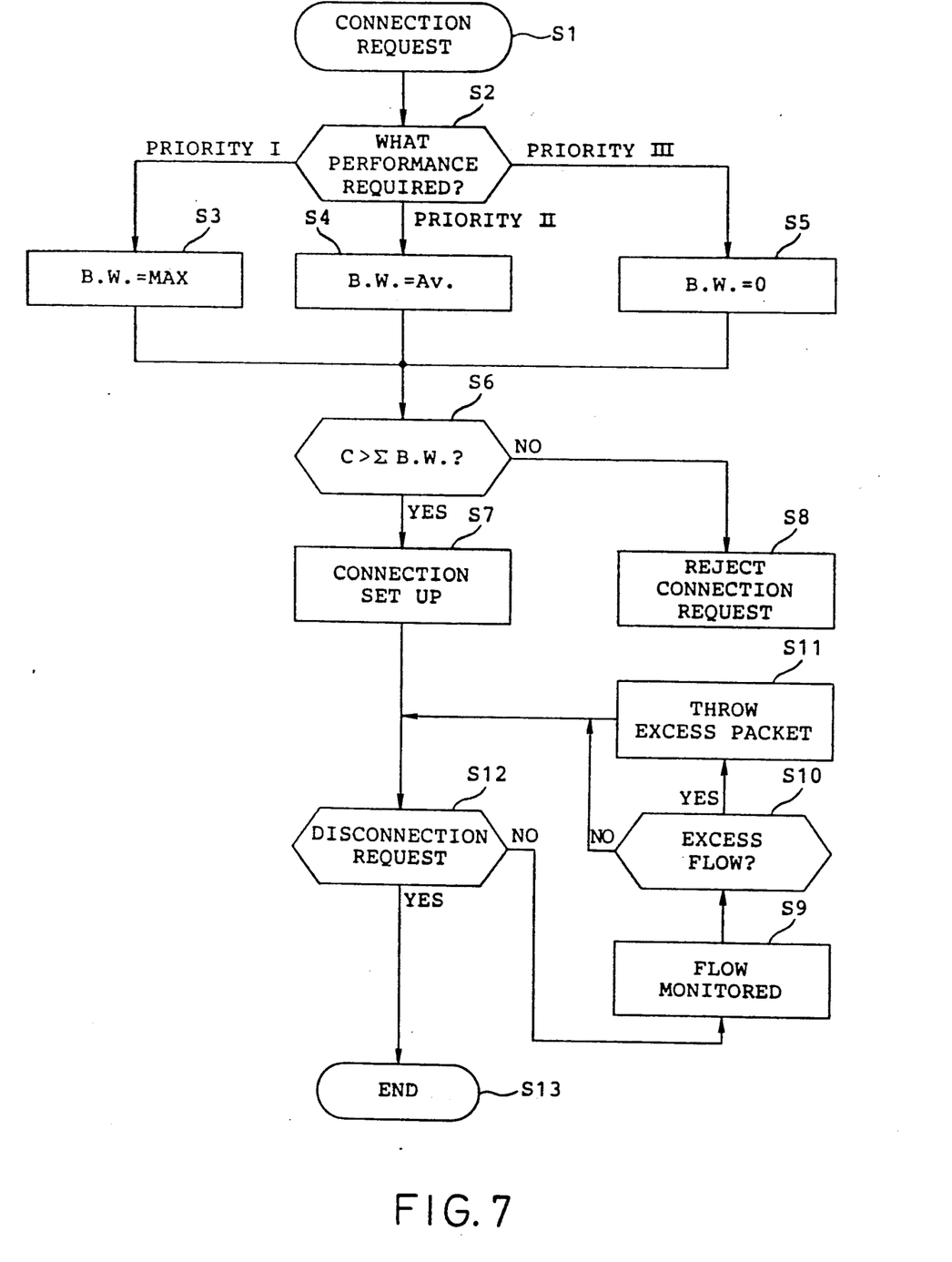
FIG. 7 is a chart illustrating a flow of operation of a bandwidth assigner in FIG. 6.

A flow of operation of the bandwidth assigner 20 from origination of the connection request to the connection setup or the reject of the connection request is shown at steps S1 through S8 in FIG. 7.

After connection requests are accepted, sources of Types I, II and III transmit individual packet signals each packet having a header containing a code of individual Priority I, II or III and destinations. The packet signals are stored in a packet buffer 22. A priority controller 23 refers to the priority code in the header of each packet in the packet buffer 22 and controls delivery of the packets to the transmission line 21 so that packets having the code of Priority I are transmitted at first, packets having the code of Priority II being transmitted when packets having the code of Priority I are absent in the packet buffer 22, then, packets having the code of Priority III being transmitted when neither packets having the code of Priority I nor packets having the code of Priority II exist in the packet buffer 22.

Thus, information from the source of Type I having Priority I is transmitted with the high transport performance. Since packets from the source of Type II are statistically multiplexed on the transmission line 21, the transport performance is not so high in comparison with Type I source but a relatively high performance can be maintained with a significant bandwidth efficiency gain of the transmission line 21.

Figure 6:
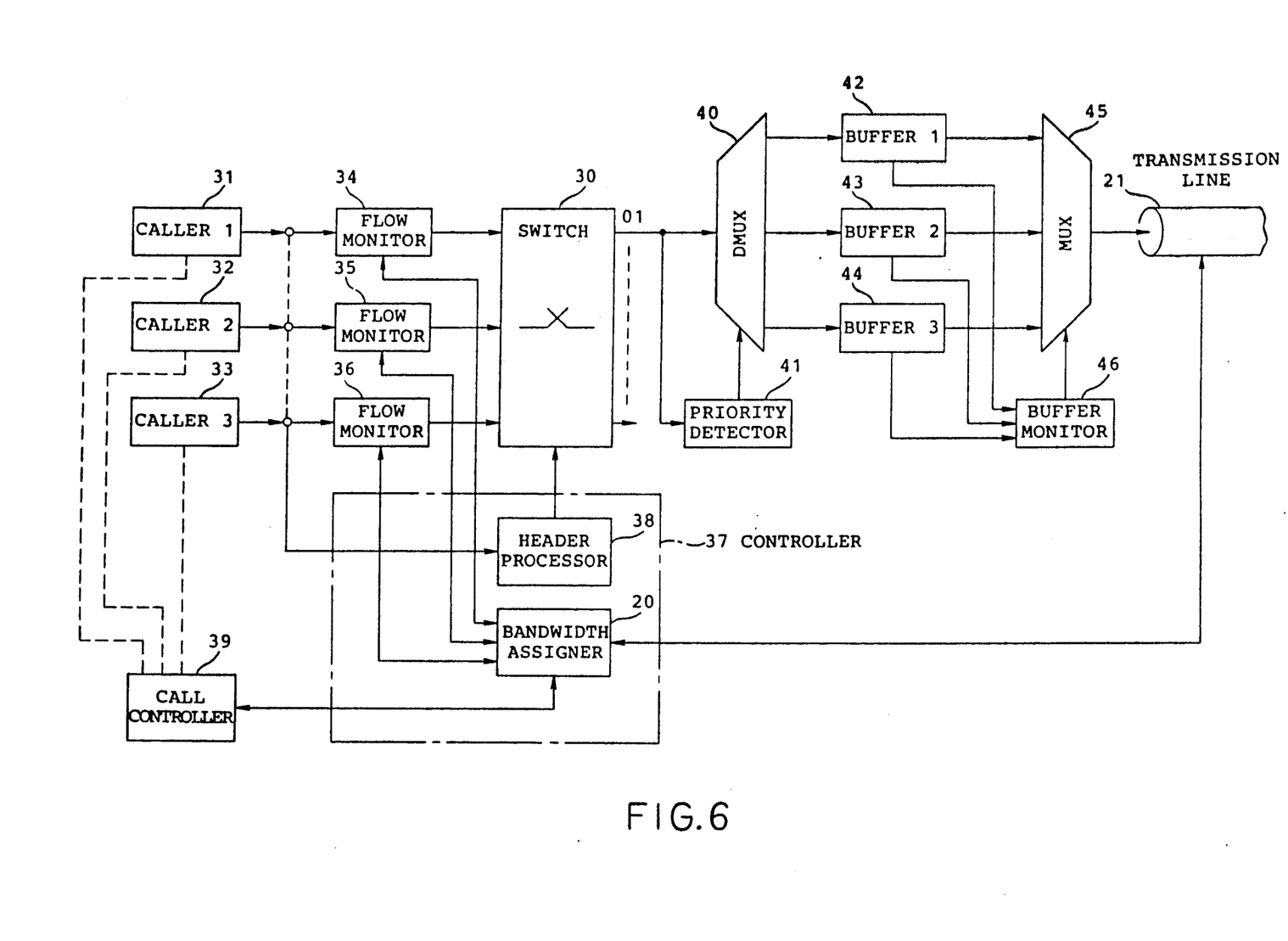
FIG. 6 is a block diagram view of an exchanger according to one embodiment of the present invention.

Referring to FIG. 6, the embodiment shown therein comprises a switch 30, a plurality of callers or subscribers (three is shown as Nos. 1, 2 and 3 callers corresponding to the sources Types I, II and III in FIG. 5, respectively) 31-33 connected to the switches through flow monitors 34-36, and a controller 37 for controlling the switch 30. The controller 37 comprises the bandwidth assigner 20 and a header processor 38 for processing the header of each packet supplied from Nos. 1-3 callers 31-33 to control switching operation of the switch 30.

Each of the callers 31-33 is provided with call controller 39 (a single call controller is shown in the figure as a representative) and delivers a connection request together with the priority code to bandwidth assigner 20.

The bandwidth assigner 20 processes a connection request from each caller 31-33 through the call controller 39 in the similar manner as described in connection with FIG. 5 according to steps S1-S8 in FIG. 7. Then, after connection requests from Nos. 1-3 callers 31-33 are accepted, packets signals are supplied from those callers 31-33 to the switch 30 and the header processor 38. The header processor 38 processes the header of each packet and controls the switch 30 according to the destination address in the header. In the present example, since the all of the callers 31-33 require to use transmission line 21, the switch 30 is controlled to deliver all of the packets from the callers 31-33 to an output O1 of the switch 30.

The output O1 of the switch 30 is connected to a demultiplexer (DMUX) 40 and a priority detector 41. The priority detector 41 detects the priority code of each packet outgoing from the output O1 of the switch 30 and controls the demultiplexer 40. The packets outgoing from the output O1 of the switch 30 are delivered to Nos. 1, 2 and 3 buffers 42-44 by the demultiplexer 40 according to the priority code. In detail, packets having Priorities I, II and III are stored into the Nos. 1-3 buffers respectively.

A mulitplexer (MUX) 45 is connected to the Nos. 1-3 buffers 42-44 and delivers packets in those buffers to the transmission line 21 in the time-division multiplexing. The multiplexer 45 is controlled by a buffer monitor 46 for monitoring contents in those buffers 42-44. When the buffer monitor 46 detects one or more packets in the No. 1 buffer 42, it controls the multiplexer 45 to deliver the packets from the No. 1 buffer 42 to the transmission line 21. When any packet is absent in the No. 1 buffer 42, the buffer monitor 46 controls the multiplexer 45 to deliver the packets in the No. 2 buffer 43 to the transmission line 21. When any packet is absent in Nos. 1 and 2 buffers 42 and 43, the packets in No. 3 buffer 44 are delivered to the transmission line 21. Thus, Types I and II of Nos. 1 and 2 callers 31 and 32 are transmitted without degradation of transport performance. However, the transport performance of Types III of No. 3 caller 33 is effected by Types I and II of Nos. 1 and 2 callers 31 and 32.

Figure 8A:
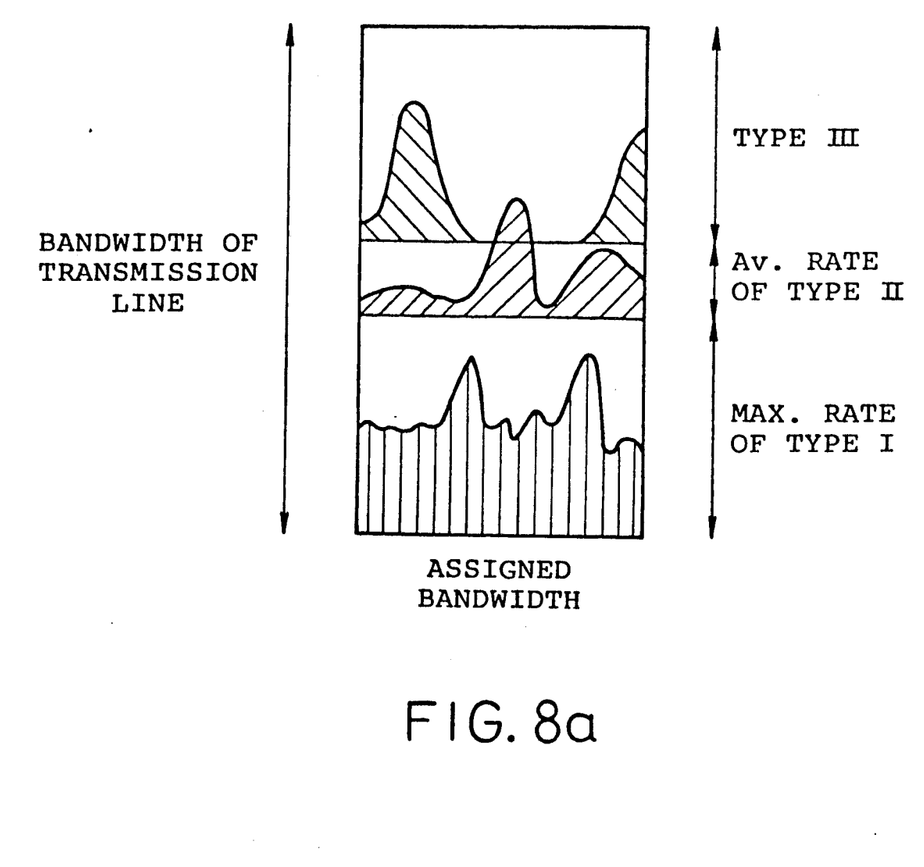
FIG. 8a 8b are views illustrating bandwidths assigned to and used by the sources of types I through III in FIG. 6.
Figure 8B:
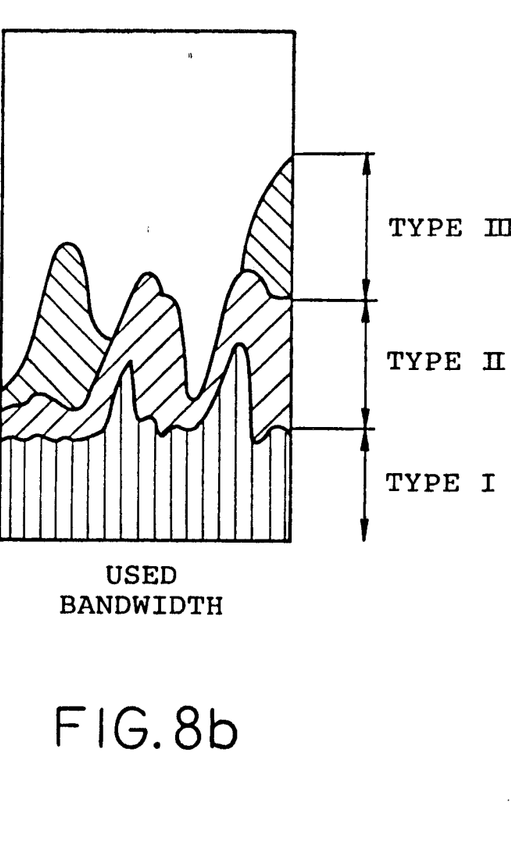

FIG. 8a illustrates bandwidth assigned to Types I, II and III and FIG. 8b shows bandwidths actually used by Types I, II and III.

In FIG. 6, the demultiplexer 40, the priority detector 41, the mulitplexer 45 and the buffer monitor 46 are corresponding to the priority controller 23 in FIG. 5, and Nos. 1-3 buffers 42-44 are corresponding to the packet buffer 22 in FIG. 5.

In the embodiment, sources are classified into three having three differenct priorities I, II and III, respectively. However, sources can be classified into two having the priorities of I and II or having priorities I and III.

Referring to FIG. 7 in addition to FIG. 6, the bandwidth assigner 20 monitors traffic flows from the callers 31-33 by use of the flow monitors 34-36 at step S9. When a monitored flow exceeds the bandwidth assigned to any one of callers 31-33 at step S10, the bandwidth assigner 20 controls the corresponding flow monitor to throw the excess packet or packets at step S11.

After reception of a disconnection request from any one of the callers 31-33 at step S12, the bandwidth assigner 20 cancels the bandwidth assignment for the caller at step S13.

In another embodiment of the present invention, the priorities are determined as to classes 1 through 3 in FIG. 2, that is, Priority I is assigned to Class 1 and class 2 while Priority II is assigned to Class 3 to which the virtual bandwidth Rv is determined based on a value of the maximum rate and the average rate.

Figure 9:
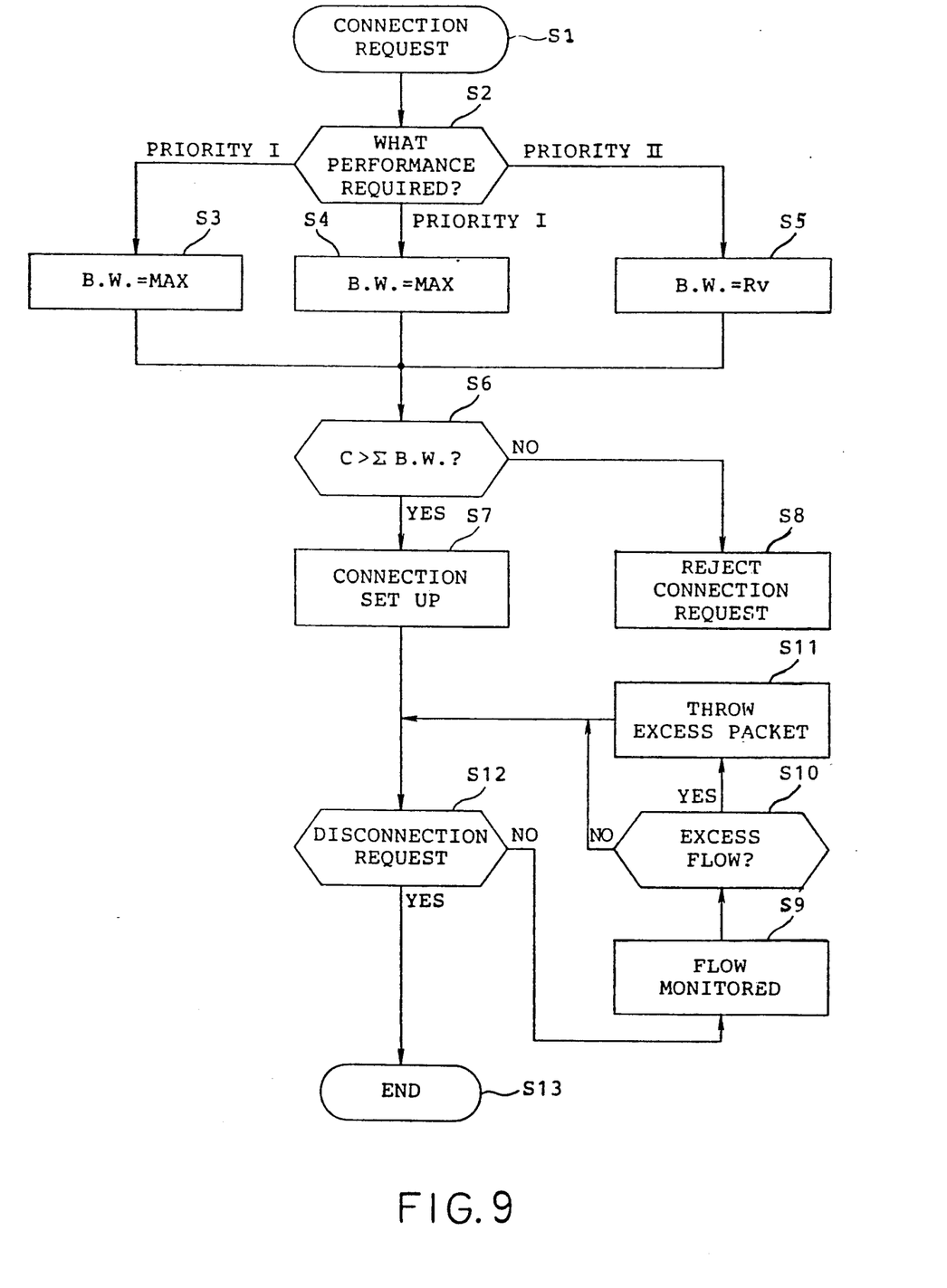
FIG. 9 is a chart illustrating a flow of operation of the bandwidth assigner in FIG. 6 according to another embodiment.
Figure 10:
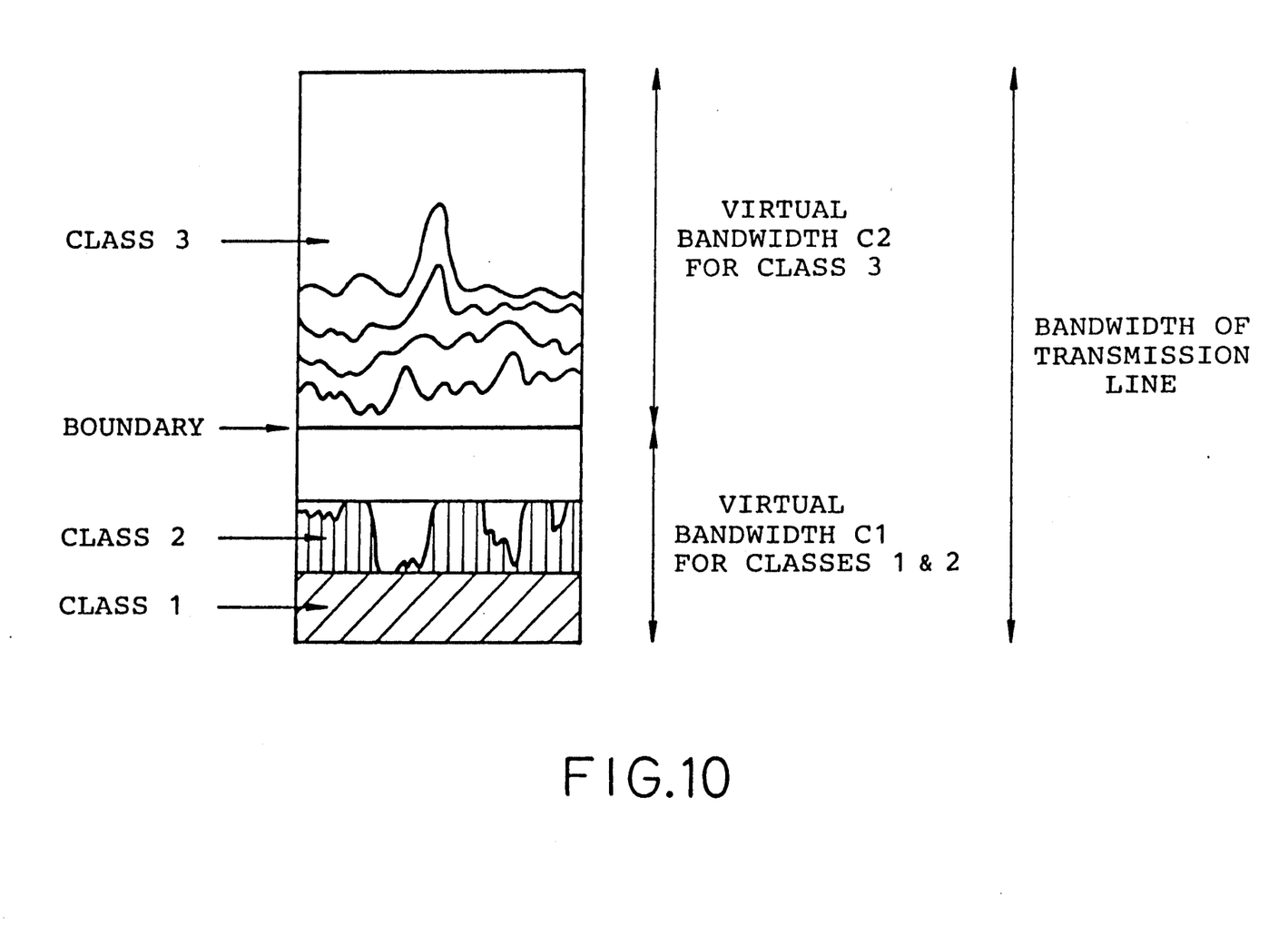
FIG. 10 is a view illustrating bandwidths assigned to different classes in FIG. 2 according to a further embodiment.

Referring to FIG. 6, Nos. 1 and 2 callers 31 and 32 are corresponding to the sources of Classes 1 and 2 in FIG. 2 and No. 3 caller 33 is corresponding to the source of Class 3 in FIG. 2. The bandwidth assigner 20 operates according to the flow chart of FIG. 9 which is similar to the chart of FIG. 7 except difference in Steps S4 and S5. That is, when the connection request is originated by Nos. 1 and 2 callers 31 and 32, the bandwidth assigner 20 assigns the maximum bandwidths to both callers 31 and 32 according to Priority I at the steps S3 and S4. While, in response to another connection request from the No. 3 caller 33, the bandwidth assigner 20 assigns the virtual bandwidth Rv to the caller 33 at step S5.

According to this embodiment, the buffer 44 in FIG. 6 should be omitted for Priority III.

In this embodiment, packets from the callers 31 and 32 are transmitted to the transmission line 21 from the buffer 42 with a priority to packets from the other caller 33. Therefore, the transport performance required by each of callers 31 and 32 is maintained without any effect from the information from the No. 3 caller 33. On the other hand, since the bandwidth of information from No. 2 caller 32 varies from time to time, the virtual bandwidth for the No. 3 caller 33 is forced to be renewed.

According to another embodiment, a fixed virtual bandwidth C1 is predetermined to be a capacity which is slightly larger than the sum of maximum bandwidths for Classes 1 and 2 assigned with Priority I and therefore, a residual bandwidth C2 has a fixed bandwidth which is used by informations sources of Class 3 assigned with Priority II. As a result, the residual bandwidth is not affected by the variation of Class 2 so that it is possible to avoid the complex renewal of the virtual bandwidth Rv for the Class 3 assigned with Priority II.

What is claimed is:

1. A call control method in a high-speed packet multiplex communication network including a transmission line with a predetermined bandwidth and accommodating a plurality of information sources, said information sources having various packet delivery rates over a range of between a peak rate and a lower rate than an average rate and demanding various transport performances, each of said packets comprising a header and a fixed bit length of digital information section, said call control method including steps of: deciding whether a connection request from a specific one of said plurality of information sources is admitted or rejected to accept said specific information source when said connection request is admitted, said connection request requiring to transport specific packets from said specific information source through said transmission line; and transmitting, upon acceptance of said specific information source, specific packets from said specific information source onto said transmission line by a time-division multiplex fashion in an asynchronous transfer mode; wherein the improvement comprising:

said information sources being preliminarily classified into two types, a first one of which demands a high transport performance while another second type being acceptable of a low transport performance, said first type being assigned with a first priority and said second type being assigned with a second priority, said connection request containing a specific one of said first and said second priorities corresponding to the type of said specific information source; and said deciding step comprising steps of:

detecting the specific priority in said connection request;

assigning a maximum bandwidth corresponding to said peak rate to said specific information source when said specific priority is said first priority;

determining whether or not said predetermined bandwidth of said transmission line is larger than a sum of said maximum bandwidth and a bandwidth assigned to all ones of said information sources currently accepted; and admitting said connection request to accept said specific information source when said predetermined bandwidth is determined larger than said sum, said specific packets being preferentially transmitted onto said transmission line at said transmitting step.

2. A call control method as claimed in claim 1, which further comprising steps of: monitoring a traffic flow of said specific packets from said specific information source after said specific information source is accepted; and throwing away excessive packets of said specific packets when said packet delivery rate from said specific information source exceeds said peak rate.

3. A call control method as claimed in claim 1, wherein said connection request is admitted without said assigning and said determining steps to accept said specific information source when said specific priority is detected as said second priority at said detecting step, said specific packets being transmitted, at said transmitting step, onto said transmission line during a time duration when there is no packet from anyone of said currently accepted information sources which has said first priority.

4. A call control method in a high-speed packet multiplex communication network including a transmission line with a predetermined bandwidth and accommodating a plurality of information sources, said information sources having various packet delivery rates over a range of between a peak rate and a lower rate than an average rate and demanding various transport performances, each of said packets comprising a header and a fixed bit length of digital information section, said call control method including steps of: deciding whether a connection request from a specific one of said plurality of information sources is admitted or rejected to accept said specific information source when said connection request is admitted, said connection request requiring to transport specific packets from said specific information source through said transmission line; and transmitting, upon acceptance of said specific information source, specific packets from said specific information source onto said transmission line by a time-division multiplex fashion in an asynchronous transfer mode; wherein the improvement comprising:

said information sources being preliminarily classified into a plurality of types, a first one of which demands a very high transport performance while another second type demanding a comparatively high transport performance, said first type being assigned with a first priority and said second type being assigned with a second priority, said connection request containing a code indicating a specific priority defined by the type of said specific information source;

said deciding step comprising steps of:

detecting the specific priority in said connection request;

assigning a specific bandwidth to said specific information source so that said specific bandwidth is a maximum bandwidth corresponding to said peak rate when said specific priority is said first priority while said specific bandwidth is an average bandwidth corresponding to said average rate when said specific priority is said second priority;

determining whether or not said predetermined handwidth of said transmission line is larger than a sum of said specific bandwidth and a bandwidth assigned to all ones of said information sources currently accepted; and admitting said connection request to accept said specific information source when said predetermined bandwidth is determined larger than said sum;

said transmitting step comprising steps of;

detecting said specific priority of said specific packets from said specific information source so that said specific packets are determined as first priority packets when said specific priority is said first priority while said specific packets are determined as second priority packets when said specific priority is said second priority; and transmitting said specific packets onto said transmission line so that said first priority packets are preferentially transmitted while said second priority packets are transmitted during a time duration when there are not first priority packets to be transmitted.

5. A call control method as claimed in claim 4, which further comprising steps of: monitoring a traffic flow of said specific packets from said specific information source after said specific information source is accepted; and throwing away excessive packets of said specific packets when said packet delivery rate from said specific information source exceeds said peak rate.

6. A call control method as claimed in claim 4, wherein said plurality of types including a third type acceptable of a low transport performance, said third type being assigned with a third priority, said connection request being admitted without said assigning and said determining steps to accept said specific information source when said specific priority is detected as said third priority at said detecting step, said specific packets being transmitted, at said transmitting step, onto said transmission line during a time duration when there are not said first and said second priority packets to be transmitted.

7. A call control method in a high-speed packet multiplex communication network including a transmission line with a predetermined bandwidth and accommodating a plurality of information sources, said information sources having various packet delivery rates over a range of between a peak rate and a lower rate than an average rate and demanding various transport performances, each of said packets comprising a header and a fixed bit length of digital information section, said call control method including steps of: deciding whether a connection request from a specific one of said plurality of information sources is admitted or rejected to accept said specific information source when said connection request is admitted, said connection request requiring to transport specific packets from said specific information source through said transmission line; and transmitting, upon acceptance of said specific information source, specific packets from said specific information source onto said transmission line by a time-division multiplex fashion in an asynchronous transfer mode; wherein the improvement comprising:

said information sources being preliminarily classified into two types, a first one of which demands a high transport performance while another second type being acceptable of a low transport performance, said first type being assigned with a first priority and said second type being assigned with a second priority, said connection request containing a specific one of said first and said second priorities corresponding to the type of said specific information source; and said deciding step comprising steps of:

detecting the specific priority in said connection request;

assigning a specific bandwidth to said specific information source so that said specific bandwidth is a maximum bandwidth corresponding to said peak rate when said specific priority is said first priority while said specific bandwidth is a virtual bandwidth corresponding to a rate between said peak rate and said average rate when said specific priority is said second priority;

determining whether or not said predetermined bandwidth of said transmission line is larger than a sum of said specific bandwidth and a bandwidth assigned to all ones of said information sources currently accepted; and admitting said connection request to accept said specific information source when said predetermined bandwidth is determined larger than said sum;

said transmitting step comprising steps of;

detecting said specific priority of said specific packets from said specific information source so that said specific packets are determined as first priority packets when said specific priority is said first priority while said specific packets are determined as second priority packets when said specific priority is said second priority; and transmitting said specific packets onto said transmission line so that said first priority packets are preferentially transmitted while said second priority packets are transmitted during a time duration when there are not first priority packets to be transmitted.

8. A call control method as claimed in claim 7, wherein said predetermined bandwidth is separated into two bands, a first band of which is for being used by said information sources of said first type while another second band is for being used by said information sources of said second type.

9. A call control system for use in a high-speed packet multiplex communication network including a transmission line with a predetermined bandwidth and accommodating a plurality of information sources, said information sources having various packet delivery rates over a range of between a peak rate and a lower rate than an average rate and demanding various transport performances, each of said packets comprising a header and a fixed bit length of digital information section, said call control system comprising: means responsive to a connection request from a specific one of said plurality of information sources for deciding whether said connection request is admitted or rejected to accept said specific information source when said connection request is admitted, said connection request requiring to transport specific packets from said specific information source through said transmission line; and means for receiving and transmitting, upon acceptance of said specific information source, specific packets from said specific information source onto said transmission line by a time-division multiplex fashion in an asynchronous transfer mode; wherein the improvement comprising:

said information sources being preliminarily classified into two types, a first one of which demands a high transport performance while another second type being acceptable of a low transport performance, said first type being assigned with a first priority and said second type being assigned with a second priority, said connection request containing a specific one of said first and said second priorities corresponding to the type of said specific information source; and said deciding means comprising:

means for detecting the specific priority in said connection request;

means for assigning a maximum bandwidth corresponding to said peak rate to said specific information source when said specific priority is said first priority;

means for determining whether or not said predetermined bandwidth of said transmission line is larger than a sum of said maximum bandwidth and a bandwidth assigned to all ones of said information sources currently accepted; and means for admitting said connection request to accept said specific information source when said predetermined bandwidth is determined larger than said sum, whereby said transmitting means preferentially transmitting said specific packets onto said transmission line.

10. A call control system as claimed in claim 9, which further comprising means coupled with said deciding means for monitoring a traffic flow of said specific packets from said specific information source after said specific information source is accepted and throwing away excessive packets of said specific packets when said packet delivery rate from said specific information source exceeds said peak rate.

11. A call control system as claimed in claim 9, wherein said admitting means admits said connection request without operation of said assigning and said determining means to accept said specific information source when detecting means detects said specific priority as said second priority, said transmitting means transmitting said specific packets onto said transmission line during a time duration when there is no packet from anyone of said currently accepted information sources which has said first priority.

12. A call control system for use in a high-speed packet multiplex communication network including a transmission line with a predetermined bandwidth and accommodating a plurality of information sources, said information sources having various packet delivery rates over a range of between a peak rate and a lower rate than an average rate and demanding various transport performances, each of said packets comprising a header and a fixed bit length of digital information section, said call control system comprising; means responsive to a connection request from a specific one of said plurality of information sources for deciding whether said connection request is admitted or rejected to accept said specific information source when said connection request is admitted, said connection request requiring to transport specific packets from said specific information source through said transmission line; and means for receiving and transmitting, upon acceptance of said specific information source, specific packets from said specific information source onto said transmission line by a time-division multiplex fashion in an asynchronous transfer mode; wherein the improvement comprising:

said information sources being preliminarily classified into a plurality of types, a first one of which demands a very high transport performance while another second type demanding a comparatively high transport performance, said first type being assigned with a first priority and said second type being assigned with a second priority, said connection request containing a code indicating a specific priority defined by the type of said specific information source;

said deciding means comprising:

means for detecting the specific priority in said connection request;

means coupled with said detecting means for assigning a specific bandwidth to said specific information source so that said specific bandwidth is a maximum bandwidth corresponding to said peak rate when said specific priority is said first priority while said specific bandwidth is an average bandwidth corresponding to said average rate when said specific priority is said second priority;

means for determining whether or not said predetermined bandwidth of said transmission line is larger than a sum of said specific bandwidth and a bandwidth assigned to all ones of said information sources currently accepted; and means coupled with said determining means for admitting said connection request to accept said specific information source when said predetermined bandwidth is determined larger than said sum;

said transmitting means comprising:

means for detecting said specific priority of said specific packets from said specific information source so that said specific packets are determined as first priority packets when said specific priority is said first priority while said specific packets are determined as second priority packets when said specific priority is said second priority; and means for transmitting said specific packets onto said transmission line so that said first priority packets are preferentially transmitted while said second priority packets are transmitted during a time duration when there are not first priority packets to be transmitted.

13. A call control system as claimed in claim 12, which further comprising means coupled with said deciding means for monitoring a traffic flow of said specific packets from said specific information source after said specific information source is accepted and throwing away excessive packets of said specific packets when said packet delivery rate from said specific information source exceeds said peak rate.

14. A call control system as claimed in claim 12, wherein said plurality of types including a third type acceptable of a low transport performance, said third type being assigned with a third priority, said connection request being admitted without operation of said assigning and said determining means to accept said specific information source when said specific priority is detected as said third priority, said transmitting means transmitting said specific packets onto said transmission line during a time duration when there are not said first and said second priority packets to be transmitted.

15. A call control system for use in a high-speed packet multiplex communication network including a transmission line with a predetermined bandwidth and accommodating a plurality of information sources, said information sources having various packet delivery rates over a range of between a peak rate and a lower rate than an average rate and demanding various transport performances, each of said packets comprising a header and a fixed bit length of digital information section, said call control system comprising means responsive to a connection request from a specific one of said plurality of information sources for deciding whether said connection request is admitted or rejected to accept said specific information source when said connection request is admitted, said connection request requiring to transport specific packets from said specific information source through said transmission line; and means for receiving and transmitting, upon acceptance of said specific information source, specific packets from said specific information source onto said transmission line by a time-division multiplex fashion in an asynchronous transfer mode; wherein the improvement comprising:

said information sources being preliminarily classified into two types, a first one of which demands a high transport performance while another second type being acceptable of a low transport performance, said first type being assigned with a first priority and said second type being assigned with a second priority, said connection request containing a specific one of said first and said second priorities corresponding to the type of said specific information source; and said deciding means comprising:

means for detecting the specific priority in said connection request;

means coupling to said detecting means for assigning a specific bandwidth to said specific information source so that said specific bandwidth is a maximum bandwidth corresponding to said peak rate when said specific priority is said first priority while said specific bandwidth is a virtual bandwidth corresponding to a rate between said peak rate and said average rate when said specific priority is said second priority;

means for determining whether or not said predetermined bandwidth of said transmission line is larger than a sum of said specific bandwidth and a bandwidth assigned to all ones of said information sources currently accepted; and means coupled with said determining means for admitting said connection request to accept said specific information source when said predetermined bandwidth is determined larger than said sum;

said transmitting means comprising:

means for detecting said specific priority of said specific packets from said specific information source so that said specific packets are determined as first priority packets when said specific priority is said first priority while said specific packets are determined as second priority packets when said specific priority is said second priority; and means for transmitting said specific packets onto said transmission line so that said first priority packets are preferentially transmitted while said second priority packets are transmitted during a time duration when there are not first priority packets to be transmitted.

* * * * *